(12) United States Patent
Guo et al.

(10) Patent No.: US 11,783,037 B1
(45) Date of Patent: Oct. 10, 2023

(54) DEFENSE METHOD OF DEEP LEARNING MODEL AIMING AT ADVERSARIAL ATTACKS

(71) Applicant: Quanzhou Equipment Manufacturing Research Institute, Quanzhou (CN)

(72) Inventors: Jielong Guo, Quanzhou (CN); Xian Wei, Quanzhou (CN); Xuan Tang, Quanzhou (CN); Hui Yu, Quanzhou (CN); Dongheng Shao, Quanzhou (CN); Jianfeng Zhang, Quanzhou (CN); Jie Li, Quanzhou (CN); Yanhui Huang, Quanzhou (CN)

(73) Assignee: Quanzhou Equipment Manufacturing Research Institute, Quanzhou (CN)

( * ) Notice: Subject to any disclaimer, the term of this patent is extended or adjusted under 35 U.S.C. 154(b) by 0 days.

(21) Appl. No.: 18/317,512

(22) Filed: May 15, 2023

(30) Foreign Application Priority Data

Oct. 27, 2022 (CN) .......................... 202211321718.1

(51) Int. Cl.
*G06F 21/56* (2013.01)
*G06N 3/08* (2023.01)
*G06F 21/55* (2013.01)

(52) U.S. Cl.
CPC .......... *G06F 21/566* (2013.01); *G06F 21/552* (2013.01); *G06N 3/08* (2013.01); *G06F 2221/034* (2013.01)

(58) Field of Classification Search
CPC . G06F 21/554; G06F 21/577; G06F 2221/034
See application file for complete search history.

(56) References Cited

U.S. PATENT DOCUMENTS

| | | | | |
|---|---|---|---|---|
| 2020/0250304 | A1* | 8/2020 | Kruus | ................... G06N 20/00 |
| 2020/0410335 | A1* | 12/2020 | Gu | ........................ G06V 10/776 |
| 2021/0001216 | A1* | 1/2021 | Sanders | ................. H04N 21/27 |
| 2021/0089866 | A1* | 3/2021 | Kolter | ....................... G06N 3/08 |
| 2021/0089970 | A1* | 3/2021 | Zeise | ........................ G06N 3/04 |

(Continued)

FOREIGN PATENT DOCUMENTS

| | | |
|---|---|---|
| CN | 111414964 A | 7/2020 |
| CN | 114364591 A | 4/2022 |

(Continued)

OTHER PUBLICATIONS

Wang, "Research on Robust Deep Learning and Its Applications in the Field of Information Security" Publication date: Nov. 1, 2019, Publication name: "Intelligent Computers and Applications".

(Continued)

*Primary Examiner* — Meng Li
(74) *Attorney, Agent, or Firm* — Kaplan Breyer Schwarz, LLP; Stuart H. Mayer

(57) ABSTRACT

Disclosed are a defense method and a model of deep learning model aiming at adversarial attacks in the technical field of image recognition, which makes full use of the internal relationship between the adversarial samples and the initial samples, and transforms the adversarial samples into common samples by constructing a filter layer in front of the input layer of the deep learning model; the parameters of the filter layer are trained by using the adversarial attack samples, so as to improve the ability of the model to resist adversarial attack; then the trained filter layer is combined with the learning model after the adversarial training, and a deep learning model with strong robustness and high classification accuracy is obtained, which ensures that the recognition ability of the initial sample is not reduced while resisting the adversarial attacks.

4 Claims, 2 Drawing Sheets

(56) References Cited

U.S. PATENT DOCUMENTS

| | | | |
|---|---|---|---|
| 2021/0110458 A1* | 4/2021 | Pande | G06Q 30/0623 |
| 2021/0192339 A1* | 6/2021 | Ho | G06F 21/55 |
| 2021/0271975 A1* | 9/2021 | Chen | G06N 3/04 |
| 2021/0390282 A1* | 12/2021 | Lin | G06V 10/774 |
| 2022/0126864 A1* | 4/2022 | Moustafa | G08G 1/096758 |
| 2022/0198790 A1* | 6/2022 | Li | G06V 10/28 |
| 2022/0207322 A1* | 6/2022 | Huang | G06N 3/08 |
| 2022/0382880 A1* | 12/2022 | Castiglione | G06N 3/08 |
| 2023/0038463 A1* | 2/2023 | Takahashi | G06N 3/08 |
| 2023/0075087 A1* | 3/2023 | Jenni | G06F 18/213 |
| 2023/0132330 A1* | 4/2023 | de Oliveira Barbalho | G06N 3/088 706/15 |
| 2023/0186091 A1* | 6/2023 | Gao | G06N 3/082 706/25 |
| 2023/0215147 A1* | 7/2023 | Li | G06V 10/7715 382/157 |

FOREIGN PATENT DOCUMENTS

| | | |
|---|---|---|
| CN | 114723663 A | 4/2022 |
| CN | 114757351 A | 7/2022 |

OTHER PUBLICATIONS

Ren, et al. "Adversarial Attacks and Defenses in Deep Learning" Engineering 6 (2020) 346-360.

* cited by examiner

DEFENSE METHOD OF DEEP LEARNING MODEL AIMING AT ADVERSARIAL ATTACKS

CROSS-REFERENCE TO RELATED APPLICATIONS

This disclosure claims priority to Chinese Patent Application No. 202211321718.1, filed on Oct. 27, 2022, the contents of which are hereby incorporated by reference.

TECHNICAL FIELD

The disclosure relates to the technical field of image recognition, and in particular to a defense method of a deep learning model aiming at adversarial attacks and a model thereof.

BACKGROUND

In recent years, deep learning model has made remarkable achievements in the fields of computer vision, natural language processing and recommendation system with its excellent feature extraction and representation ability. However, with the increasingly extensive and in-depth application of the deep learning model, its security problem has attracted the attention of researchers. Szegedy et al. first put forward the concept of adversarial attacks, that is, the images that the deep learning model can't recognize by adding subtle disturbances to the initial images is called adversarial samples. The existence of adversarial samples shows the fragility of deep learning model to some extent, which casts a shadow on the application of the deep learning model in some key facilities or security-sensitive environments. Because in these scenarios, adversarial samples may lead to wrong decisions made by the deep learning model, which may cause economic losses and even threaten people's lives. Therefore, it is necessary to study the defense method of the deep learning model to resist adversarial attacks.

In order to improve the defense ability of the models, researchers have proposed many algorithms to improve the robustness of the models. Adversarial training is the method with the highest classification accuracy for adversarial samples of the models at present. Adversarial training is to train the models by mixing the adversarial sample with the initial sample so as to adapt the models to the adversarial attack. However, the practice of taking the adversarial samples as an "independent" data point in the data space makes the model learn the classification boundaries of the initial samples and the adversarial samples at the same time, while some of the initial samples are not correctly learned, which leads to the improvement of the ability of the models to resist the adversarial attacks and the reduction of the recognition ability of the initial samples.

SUMMARY

In view of this, the disclosure provides a defense method of a deep learning model aiming at adversarial attacks, which may improve the ability of the models to resist adversarial attacks without reducing the recognition ability of the initial samples.

The defense method of a deep learning model aiming at adversarial attacks provided by the present disclosure, including following steps:

S1, obtaining an untrained initial deep learning model $M_0$, initial sample image data $D_n$ used for a training, and adversarial sample image data $D_a$ based on $D_n$;

S2, training the model $M_0$ with the data $D_n$ to obtain a model $M_n$, and training with the data $D_n$ and the data $D_a$ to obtain a model $M_a$;

S3, constructing a filter layer, and embedding the filter layer in front of an input layer of the model $M_n$ to obtain a new model $M_{nc}$, where the filter layer is used for spatially transforming input data from the adversarial sample to the initial sample without losing image information;

S4, training an image classification ability of the model $M_{nc}$ by using the data $D_a$, keeping model parameters of a part initially belonged to $M_n$ of the $M_{nc}$ unchanged in the training, and only training filter layer parameters, and limiting a two-norm condition number of a weight matrix of the filter layer by using the differential condition number constraint function; and S5, taking the filter layer trained in the S4 out separately and inserting it in front of an input layer of the model $M_a$ to obtain a deep learning model $M_{ac}$ for detecting initial images and images with adversarial attack noise, and obtaining a correct image classification.

Further, types of the initial deep learning model include VGG-16 and Vision Transformer.

Further, the method for obtaining the adversarial sample image data $D_a$ based on $D_n$ includes:
  determining the adversarial attacks that need to be defended;
  applying the adversarial attacks to the initial sample image data $D_n$ to obtain adversarial sample image data $D_a$.

Further, the filter layer constructed in the S3 includes a linear layer, an activation function layer and a normalization layer, and a number of layers are not fixed and may be adjusted according specific tasks, and the parameters are learnable.

Further, in the training of the model $M_{nc}$ in the S4, a differentiable condition number constraint function is added to a loss function to limit a two-norm condition number of the filter layer weight matrix in addition to using a cross entropy loss function to train the image classification ability of the model.

Further, when training the model $M_{nc}$, the following two differentiable condition number constraint functions are added to the loss function:

$$\rho(A) = \frac{1}{2k^2} \cdot \|A\|_F^2$$

$$h(A) = \frac{1}{4k\log(k)} \cdot \left(\log\left(v + \frac{1}{k}\det|A^T A|\right)\right)^2,$$

where $\|\cdot\|_F$ represents a Frobenius norm of a matrix; A represents the weight matrix of the filter layer; k represents a smaller value of a length and a width of the weight matrix; v is a small constant to ensure that a logarithmic function is meaningful, and a v value is greater than 0 and far less than 1.

By applying the above method, a deep learning model aiming at adversarial attacks is obtained, including:
  a filtering layer is used for spatially transforming the input data from the adversarial sample to the initial sample without losing image information;

the deep learning model after adversarial training;
where, the filtering layer is positioned in front of the learning model input layer.

Further, the filter layer includes a linear layer, an activation function layer and a normalization layer, and the number of layers is not fixed and may be adjusted according specific tasks, and the parameters are learnable.

The defense method of the deep learning model provided by the present disclosure makes full use of the internal relationship between the adversarial samples and the initial samples, and transforms the adversarial samples into common samples by constructing a filter layer in front of the input layer of the deep learning model; the parameters of the filter layer are trained by using the adversarial attack samples, so as to improve the ability of the model to resist adversarial attack; then the trained filter layer is combined with the learning model after the adversarial training, and a deep learning model with strong robustness and high classification accuracy is obtained, which ensures that the recognition ability of the initial sample is not reduced while resisting the adversarial attacks.

Compared with the prior art, the beneficial effects of the disclosure are as follows: firstly, a filter layer is constructed by using the internal relationship between the adversarial samples and the initial samples, and the adversarial samples are transformed; when the initial samples are the input, the learning model works normally, and when the adversarial samples are input, the adversarial samples are transformed into the corresponding common sample space to resist specific adversarial attacks; secondly, the recognition ability of the initial samples is not reduced; thirdly, the filter layer may be flexibly adjusted, and different adversarial samples may be used for the training, which may adapt to different kinds of adversarial attacks.

DETAILED DESCRIPTION OF THE EMBODIMENTS

The present disclosure will be described in detail with reference to the accompanying drawing and embodiments.

Figure 1:
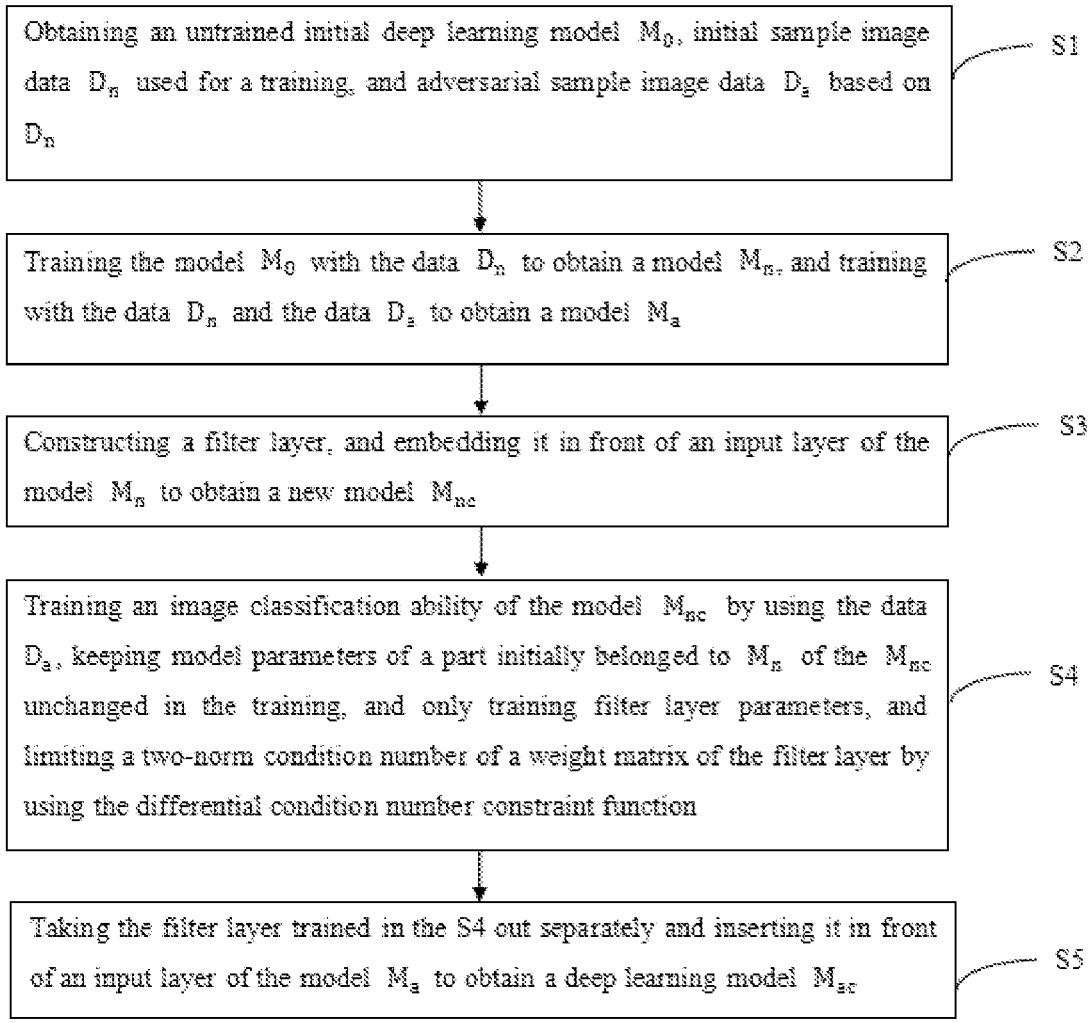
FIG. 1 is a flowchart according to an exemplary embodiment of the present disclosure.

The disclosure provides a defense method of a deep learning model aiming at adversarial attacks. FIG. 1 shows a flowchart of an exemplary embodiment. According to FIG. 1, MPSoCZCU105 development board is taken as an example to test the embedded platform, and the main steps are as follows:

S1, an untrained initial deep learning model $M_0$, a common CIFAR-10 image data set for a training, and a adversarial CIFAR-10 data set for adding a PGD adversarial attack noise are obtained.

S2, training the model $M_0$ on the common CIFAR-10 data set by using a classical random gradient descent training algorithm, and the model $M_n$ is saved when a relatively high classification accuracy is obtained; in addition, the model $M_0$ is trained by using the common CIFAR-10 data set and the adversarial sample CIFAR-10 data set, and the model $M_a$ is obtained.

S3, a filter layer is constructed for spatially transforming the input data from the adversarial samples to the initial samples without losing image information. Before the filter layer is added to the input layer of the model $M_n$, a new model $M_{nc}$ is obtained, that is, when the image is input into a model $M_{nc}$, the image needs to pass through the filter layer first, and then the results pass through all layers of the model $M_{nc}$, and finally the model prediction results are output.

Figure 2:
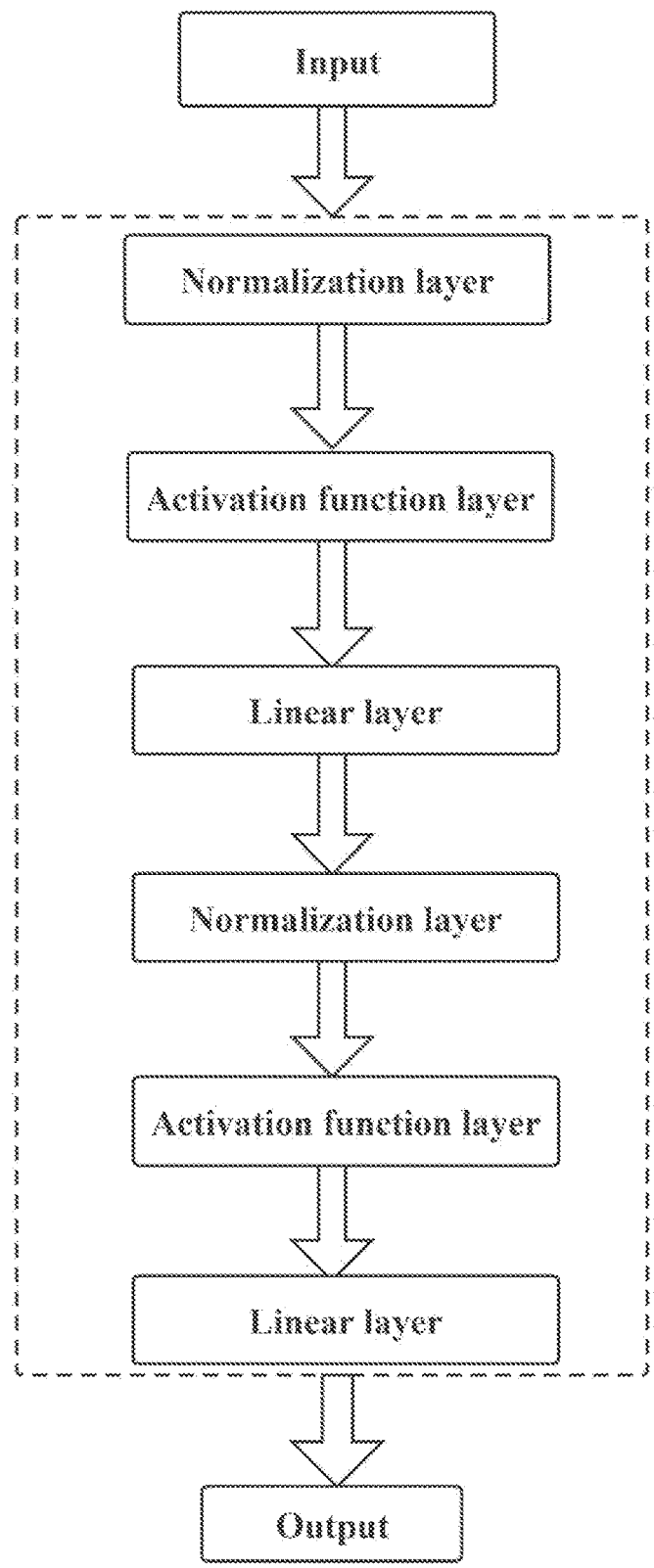
FIG. 2 is a schematic diagram of a filter layer in an exemplary embodiment.

The exemplary filter layer is mainly composed of a two-layer linear layer, an activation function layer and a normalization layer, as shown in FIG. 2, and the parameters are learnable.

S4, for the model $M_{nc}$, the classical random gradient descent training algorithm is used to carry out a training on the data set resist CIFAR-10. Especially, in the training, the model parameters of the part initially belonged to $M_n$ of the model $M_{nc}$ are kept unchanged, and only the filter layer parameters are trained, and the differential condition number constraint function is added when calculating the training loss function, so as to limit the matrix two-norm condition number of the filter layer parameter matrix to approach 1. When the condition number of a parameter matrix is 1, the parameter matrix has strong anti-interference ability for small disturbances. Through this training method, the filter layer may obtain the ability to transform the adversarial samples into the initial samples.

Two exemplary differentiable condition number constraint functions are as follows:

$$\rho(A) = \frac{1}{2k^2} \cdot \|A\|_F^2$$

$$h(A) = \frac{1}{4k\log(k)} \cdot \left(\log\left(v + \frac{1}{k}\det|A^T A|\right)\right)^2.$$

S5, the filtering layer trained in the S4 is saved separately and added to the input layer of the model $M_a$, so that the deep learning model $M_{ac}$ with high robustness and high classification accuracy is obtained. When the common CIFAR-10 data set or the adversarial CIFAR-10 data set are input into the model for classification and prediction, the image may be processed by the filter layer first, and then the final prediction results may be obtained by each layer of the model.

The deep learning model obtained by using the defense method of the deep learning model includes an initial deep learning model after adversarial training and a filter layer, and the filter layer is in front of the input layer of the learning model, and the model works normally when the input is a common sample, and when the input is a adversarial sample, the filter layer will transform the adversarial sample into a corresponding common sample space.

In this disclosure, the constructed filter layer in the S3 ensures that the common CIFAR-10 data set may be normally identified and classified by the model after the filter layer is added to the model through the training method in the S4.

In the training method of the S4, because the condition number constraint function is differentiable, the condition number of the filter layer weight matrix tends to be 1 when the model optimization training is carried out by methods such as random gradient descent, while the matrix with the two-norm condition number of 1 is insensitive to the small disturbance, which makes the filter layer obtained by using the training method described in the S4 have the ability of resisting the small disturbance, and resisting attack noise interferes with the identification of deep learning model by adding small disturbance imperceptible to human eyes.

Generally speaking, when the model learns both common CIFAR-10 and adversarial CIFAR-10 data sets, the model has higher classification accuracy for common data sets and lower classification accuracy for adversarial sample data sets. However, the filter layer of the present disclosure may "filter" small disturbances, that is, the output results of the adversarial sample passing through the filter layer is closer to the output results of the corresponding common sample, so it can be seen that the adversarial sample is indirectly "transformed" into the common sample, which may effectively improve the classification accuracy of the model to the adversarial sample without reducing the classification ability to the common sample.

Application and Test Examples

Using MPSoCZCU105 development board as an embedded test platform, the ability of the image classification deep learning model of this embodiment to resist attack noise is tested through the following experiments.

Using CIFAR-10 image data set from www.cs.toronto.edu/-kriz/cifar.htm, the basic situation of the data set includes: (a) the image data set has 50,000 training pictures and 10,000 verification pictures, each picture size is a matrix of 32*32; (b) there are 10 types of pictures in the data set, and each type has the same number of pictures, that is, there are 5,000 pictures in each type in the training set and 1,000 pictures in the verification set.

The experimental method is as follows:

1) On the GPU platform, the image data set processed by the adversarial attack algorithm is used for various types of adversarial attack training, and a deep learning model with strong robustness is obtained. The initial image classification models used in this experiment are VGG-16 and VisionTransformer. The adversarial attack algorithm uses the strongest first-order algorithm PGD based on gradient. It is generally believed that all first-order attacks may be defended if PGD attacks may be resisted.
2) The trained deep learning model is deployed to the ARM processor through the format conversion.
3) The classic common image data set CIFAR-10 is used to carry out the experiment. Using ncnn deep learning framework, the test program is written based on C++ programming language.

The experimental results are as follows:

TABLE 1

The classification success rate of the model trained by this method after being attacked by common adversarial attack algorithms

| Defense method | VGG-16 | | Vision Transformer | |
| --- | --- | --- | --- | --- |
| | Before training | After training | Before training | After training |
| Standard adversarial training | 92.2%/0.1% | 78.4%/44.9% | 99.1%/0.3% | 83.6%/60.1% |
| Trades | | 80.0%/46.1% | | 85.2%/62.3% |
| MART | | 73.3%/46.8% | | 84.8%/60.6% |
| ARLST | | 80.2%/47.1% | | 86.1%/63.9% |

The standard adversarial training in Table 1, Trades and MART are both classic methods, and ARLST (Adversarial Robust and Lightweight Separable Transformation) is the abbreviation of the method proposed in this disclosure. In the experiment, the model is trained by the above method, and then the PGD attack algorithm is used to generate adversarial samples. Finally, these adversarial samples are used to test the classification accuracy of the model.

Table 1 shows the classification accuracy of the model. The first figure is the accuracy of natural samples, followed by the adversarial samples. The higher the classification accuracy of the adversarial samples, the stronger the defense ability of the model resist adversarial attacks. The experimental results show that the classification accuracy of the model is greatly improved after training with each method, which shows that the model has certain ability to resist adversarial attacks. The method ARLST proposed by the present disclosure has the highest classification accuracy, which means that the effect of the defense method of a deep learning model aiming at adversarial attacks provided by the disclosure is superior to the existing common methods, and the practicability of the method under the embedded computing platform is also proved.

To sum up, the above is only the preferred embodiment of the present disclosure, and is not used to limit the protection scope of the present disclosure. Any modification, equivalent substitution, improvement, etc. made within the spirit and principle of the disclosure should be included in the protection scope of the disclosure.

What is claimed is:

1. A defense method of a deep learning model aiming at adversarial attacks, comprising following steps:
    step S1, obtaining an untrained initial deep learning model $M_0$, initial sample image data $D_n$ used for a training, and adversarial sample image data $D_a$ based on $D_n$;
    step S2, training the model $M_0$ with the data $D_n$ to obtain a model $M_n$, and training with the data $D_n$ and the data $D_a$ to obtain a model $M_a$;
    step S3, constructing a filter layer, and embedding it in front of an input layer of the model $M_n$ to obtain a new model $M_{nc}$, wherein the filter layer is used for spatially transforming input data from the adversarial sample to the initial sample without losing image information;
    step S4, training an image classification ability of the model $M_{nc}$ by using the data $D_a$, keeping model parameters of a part initially belonged to $M_n$ of the $M_{nc}$ unchanged in the training, and only training filter layer parameters; in the training, adding a differentiable condition number constraint function to a loss function to limit a two-norm condition number of a weight matrix of the filter layer in addition to using a cross entropy loss function to train the image classification ability of the model; and
    step S5, taking the filter layer trained in the step S4 out separately and inserting it in front of an input layer of the model $M_a$ to obtain a deep learning model $M_{ac}$ for detecting initial images and images with adversarial attack noise, and obtaining a correct image classification;
    wherein the differentiable condition number constraint function is as follows:

$$\rho(A) = \frac{1}{2k^2} \cdot \|A\|_F^2$$

$$h(A) = \frac{1}{4k\log(k)} \cdot \left(\log\left(v + \frac{1}{k}\det|A^T A|\right)\right)^2,$$

wherein $\|\cdot\|_F$ represents a Frobenius norm of a matrix; A represents the weight matrix of the filter layer; k represents a smaller value of a length and a width of the weight matrix; v is a small constant to ensure a logarithmic function is meaningful, and its value is greater than 0 and far less than 1.

2. The method according to claim 1, wherein types of the initial deep learning model comprise VGG-16 and Vision Transformer.

3. The method according to claim 1, wherein a method for obtaining the adversarial sample image data $D_a$ based on $D_n$ comprises:
   determining the adversarial attacks to be defended; and
   applying the adversarial attacks to the initial sample image data $D_n$ to obtain adversarial sample image data $D_a$.

4. The method according to claim 1, wherein the filter layer constructed in the step S3 comprises a linear layer, an activation function layer and a normalization layer, and a number of layers is not fixed and subject to specific tasks, and the parameters are learnable.

* * * * *